(12) United States Patent
Lee

(10) Patent No.: US 11,262,903 B2
(45) Date of Patent: Mar. 1, 2022

(54) IOT DEVICE CONTROL SYSTEM AND METHOD USING VIRTUAL REALITY AND AUGMENTED REALITY

(71) Applicant: DATA ALLIANCE CO., LTD., Seoul (KR)

(72) Inventor: Kwang Bum Lee, Bucheon-si (KR)

(73) Assignee: DATA ALLIANCE CO., LTD., Seoul (KR)

( * ) Notice: Subject to any disclaimer, the term of this patent is extended or adjusted under 35 U.S.C. 154(b) by 0 days.

(21) Appl. No.: 17/042,748

(22) PCT Filed: Mar. 30, 2018

(86) PCT No.: PCT/KR2018/003755
§ 371 (c)(1),
(2) Date: Sep. 28, 2020

(87) PCT Pub. No.: WO2019/189965
PCT Pub. Date: Oct. 3, 2019

(65) Prior Publication Data
US 2021/0149551 A1    May 20, 2021

(51) Int. Cl.
*G06F 3/0484* (2013.01)
*G16Y 40/30* (2020.01)
(Continued)

(52) U.S. Cl.
CPC .......... *G06F 3/04847* (2013.01); *G06F 3/011* (2013.01); *G16Y 10/75* (2020.01); *G16Y 40/30* (2020.01)

(58) Field of Classification Search
CPC ..... G06F 3/011; G06F 3/04847; G16Y 10/75; G16Y 40/30
See application file for complete search history.

(56) References Cited

U.S. PATENT DOCUMENTS

| 2005/0190972 A1* | 9/2005 | Thomas | G06K 9/209 |
| | | | 382/218 |
| 2011/0138285 A1* | 6/2011 | Kuo | G06F 3/167 |
| | | | 715/727 |

(Continued)

FOREIGN PATENT DOCUMENTS

| KR | 20160104347 A | * | 9/2016 | ........... H04L 67/18 |
| KR | 20160140347 A | * | 12/2016 | |

(Continued)

OTHER PUBLICATIONS

English Translation—Written Opinion of the International Searching Authority for PCT/KR2018/003755 (Dec. 3, 2018). (Year: 2018).*

*Primary Examiner* — Eric J. Bycer
(74) *Attorney, Agent, or Firm* — Rabin & Berdo, P.C.

(57) ABSTRACT

The present disclosure relates to an IoT device control system and method, including: by a user terminal, capturing an image of a real space that includes therein one or more IoT devices; when capturing the image, matching and registering at least one of a position and a posture of the user terminal with an IoT device selected by a user; displaying a control screen for the selected IoT device when the user terminal satisfies a condition, wherein the condition is determined by using at least one of the position and the posture of the user terminal matched and registered with the selected IoT device; and controlling the selected IoT device according to a user input received through the control screen. According to the present disclosure, a user can conveniently check and control an IoT device to be controlled, by using virtual reality and augmented reality.

4 Claims, 6 Drawing Sheets

(51) Int. Cl.
  *G16Y 10/75*    (2020.01)
  *G06F 3/01*    (2006.01)
  *G06F 3/04847*   (2022.01)

(56) References Cited

U.S. PATENT DOCUMENTS

| | | | | | |
|---|---|---|---|---|---|
| 2012/0154557 | A1* | 6/2012 | Perez | ............... | H04N 21/47205 |
| | | | | | 348/53 |
| 2013/0156266 | A1* | 6/2013 | Horii | ................ | G06F 3/016 |
| | | | | | 382/103 |
| 2013/0314443 | A1* | 11/2013 | Grassick | ................ | G06T 7/70 |
| | | | | | 345/633 |
| 2014/0132484 | A1* | 5/2014 | Pandey | ................ | G06T 11/60 |
| | | | | | 345/8 |
| 2014/0168262 | A1* | 6/2014 | Forutanpour | ......... | G06T 19/006 |
| | | | | | 345/633 |
| 2014/0184550 | A1* | 7/2014 | Hennessey | ............. | G06F 3/013 |
| | | | | | 345/173 |
| 2015/0161476 | A1* | 6/2015 | Kurz | ................. | G06K 9/6202 |
| | | | | | 382/190 |
| 2015/0310664 | A1* | 10/2015 | Boussard | ............. | H04N 13/275 |
| | | | | | 345/633 |
| 2016/0034039 | A1* | 2/2016 | Maeda | ................... | G06F 3/017 |
| | | | | | 715/810 |
| 2017/0032114 | A1* | 2/2017 | Turgeman | ............... | G06F 3/041 |
| 2017/0061696 | A1* | 3/2017 | Li | ........................ | G02B 27/017 |
| 2017/0180489 | A1* | 6/2017 | Oh | .......................... | H04L 67/36 |
| 2018/0181199 | A1* | 6/2018 | Harvey | .................. | G06F 3/014 |
| 2018/0365479 | A1* | 12/2018 | Lee | ..................... | G06K 9/00087 |
| 2019/0037173 | A1* | 1/2019 | Lee | ....................... | H04W 76/15 |

FOREIGN PATENT DOCUMENTS

| | | | | |
|---|---|---|---|---|
| KR | 1020160140347 A | | 12/2016 | |
| KR | 101709715 B1 | | 2/2017 | |
| KR | 1020170091913 A | | 8/2017 | |
| KR | 101773768 B1 | * | 9/2017 | ......... H04L 12/2823 |
| KR | 101773768 B1 | | 9/2017 | |
| KR | 1020170108285 A | | 9/2017 | |
| KR | 1020180012038 A | | 2/2018 | |

* cited by examiner

IOT DEVICE CONTROL SYSTEM AND METHOD USING VIRTUAL REALITY AND AUGMENTED REALITY

TECHNICAL FIELD

The present disclosure relates to an IoT device control system and method, and more particularly, to an IoT device control system and method using virtual reality and augmented reality.

BACKGROUND ART

The term "Internet of Things (IoT)" first appeared at Auto-ID Lab of the Massachusetts Institute of Technology (MIT) in 1998. Then the ITU-T released an annual report titled 'The Internet of Things' in 2005, predicting that the Internet of Things will become the fundamental framework for all the structures of the future information technology (IT) industrial revolution. The report defined the Internet of Things as "a new information and communication foundation that connects all the things that exist in the world through a network so that people and things, and things and things can communicate with each other anytime, anywhere." In other words, the IoT can be considered as an infrastructure for realizing a ubiquitous space in name and reality. Such a ubiquitous space starts from the fact that computing devices with specific functions are embedded in the environment and objects, and the environment or objects themselves become intelligent.

Since the IoT devices are commonly built on the basis of miniaturization and low power consumption, in many cases, except for only a few buttons (power button or the like), the means for the high-spec user interface (UI), for example, input/output means such as touch screen or LCD is not provided. In order to solve this problem, an application for controlling the corresponding IoT device is installed on a smartphone and a PC, to perform control using the application. For example, in order to check or adjust the current illumination and lifespan of a smart light that does not have a display unit, the information of the smart light may be checked and controlled by running a dedicated application installed on a device such as a smartphone or PC for the smart light. It goes without saying that, even a device having separate input and output such as a smart TV or the like, the information of the corresponding device can be checked and controlled by running a dedicated application installed on a smart phone or PC.

However, in related art, a list of devices that can be controlled by a user is provided so that the devices to be controlled are selected by the user. However, when there are multiple IoT devices of the same type installed in one space, it is inconvenient for the user to select a device to be controlled from the list of devices.

SUMMARY

Technical Problem

Accordingly, a technical problem to be solved by the present disclosure is to provide a system and method for a user to conveniently check and control an IoT device to be controlled using virtual reality and augmented reality.

Technical Solution

In order to accomplish the technical objectives mentioned above, an IoT device control method using virtual reality and augmented reality according to the present disclosure is provided, which may include, by a user terminal, capturing an image of a real space that includes therein one or more IoT devices, when capturing the image, matching and registering at least one of a position and a posture of the user terminal with an IoT device selected by a user, displaying a control screen for the selected IoT device when the user terminal satisfies a condition, wherein the condition is determined by using at least one of the position and the posture of the user terminal matched and registered with the selected IoT device, and controlling the selected IoT device according to a user input received through the control screen.

The condition may be satisfied when the user terminal is positioned within a position range determined based on the position of the user terminal matched and registered with the selected IoT device.

The condition may be satisfied, when the user terminal is positioned within a position range determined based on the position of the registered user terminal matched and registered with the selected IoT device and when the posture of the user terminal is within a posture range determined based on the posture of the user terminal matched and registered with the selected IoT device.

The method may further include, when a position and a viewpoint of a user in a virtual space in which the one or more IoT terminals are disposed correspondingly to the real space satisfy the condition, displaying a control screen for the selected IoT device in the virtual space, and controlling the selected IoT device according to a user input received through the control screen displayed in the virtual space.

In order to accomplish the technical objectives mentioned above, an IoT device control system using virtual reality and augmented reality according to the present disclosure is provided, which may include, a user terminal configured to capture an image of a real space that includes therein one or more IoT devices, and a server configured to, when capturing the image, match and register at least one of a position and a posture of the user terminal with an IoT device selected by a user.

The user terminal may display a control screen for the selected IoT device when the user terminal satisfies a condition, in which the condition may be determined by using at least one of the position and the posture of the user terminal matched and registered with the selected IoT device.

The server may be configured to transmit a control command for controlling the selected IoT device to the selected IoT device according to a user input received through the control screen.

The server may be configured to, when a position and a viewpoint of a user in a virtual space in which the one or more IoT terminals are disposed correspondingly to the real space satisfy the condition, display a control screen for the selected IoT device in the virtual space, and transmit a control command for controlling the selected IoT device to the selected IoT device according to a user input received through the control screen displayed in the virtual space.

Advantageous Effects

According to the present disclosure, a user can conveniently check and control an IoT device to be controlled, by using virtual reality and augmented reality.

DETAILED DESCRIPTION OF THE INVENTION

Hereinafter, embodiments of the present disclosure will be described in detail with reference to the accompanying drawings. The configuration of the present disclosure and operation and effect thereof will be clearly understood through the detailed description below.

Figure 1:
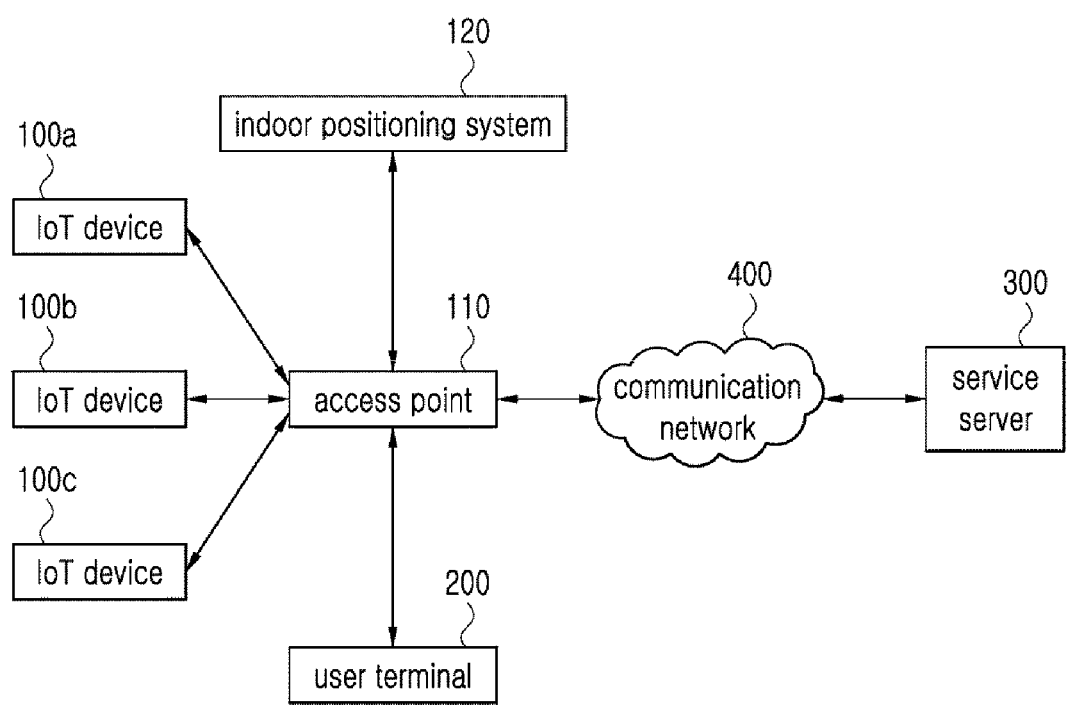
FIG. 1 is a block diagram showing a configuration of an IoT device control system according to an embodiment of the present disclosure.

FIG. 1 is a block diagram showing a configuration of an IoT device control system according to an embodiment of the present disclosure.

Referring to FIG. 1, the IoT device control system according to an embodiment of the present disclosure may include a plurality of IoT devices 100a, 100b, and 100c, an access point 110, an indoor positioning system 120, a user terminal 200, and a service server 300.

The plurality of IoT devices 100a, 100b, and 100c, the access point 110, the indoor positioning system 120, the user terminal 200 and the service server 300 may exchange information and data with each other through a communication network 400.

The communication network 400 may include a local area network (LAN), a metropolitan area network (MAN), a wide area network (WAN), the Internet, 2G, 3G, 4G, LTE mobile communication network, Bluetooth™, a Wi-Fi, Wibro™, a satellite communication network, a low power wide area (LPWA) network such as LoRa™, Sigfox™, or the like, and any communication method regardless of whether the communication method is wired or wireless.

In FIG. 1, three IoT devices 100a, 100b, and 100c and one access point 110 are shown for convenience of description, but their number may increase or decrease according to a spatial environment in which IoT device services are provided.

The IoT devices 100a, 100b, and 100c may be applied to all devices, including various sensors, information providing devices, convenience facilities, game consoles, security devices, home appliances, and so on, without restrictions on types. For example, the IoT device may include all home appliances capable of communication, such as refrigerators, ovens, washing machines, vacuum cleaners, printers, fax machines, multifunction devices, webcams, televisions, video, DVD players, audio, record players, interphones, air conditioners, heaters, dehumidifiers, and the like. In addition, the IoT device may include various sensors capable of obtaining information from tangible objects and the surrounding environment, such as temperature sensors, humidity sensors, thermal sensors, gas sensors, illuminance sensors, ultrasonic sensors, remote sensing sensors, synthetic aperture radar (SAR), radars, position sensors, motion sensors, image sensors, and the like.

The IoT devices 100a, 100b, and 100c may be implemented as devices that support wireless communication through Bluetooth™, Wi-Fi, and/or a low power wide area (LPWA) network such as LoRa™ and Sigfox™.

The access point 110 may support the access of the IoT devices 100a, 100b, and 100c to the service server 300 or the like through the communication network 400 in a space where the IoT devices 100a, 100b, and 100c are installed. For example, the access point 110 may be implemented as a device that enables wireless devices to be connected to wired devices by a related standard using Wi-Fi in a computer network. It goes without saying that the access point 110 may be implemented as a device capable of connecting a plurality of devices to the service server 300, through the communication network 400 with a short-range wireless communication method other than Wi-Fi.

The indoor positioning system 120 is capable of positioning of the user terminal 200 based on a predetermined reference point in an indoor environment. Various indoor positioning methods such as Wi-Fi, Bluetooth™, and visible light communication are known, and the indoor positioning system 120 according to the present disclosure may be implemented using any indoor positioning method as long as the position of the user terminal 200 may be determined in a real space in which the IoT devices 100a, 100b, and 100c are installed.

FIG. 1 shows that the indoor positioning system 120 is connected to the user terminal 200 through the access point 110, but the indoor positioning system 120 may perform indoor positioning by interworking with the user terminal 200 without passing through the access point 110.

The user terminal 200 may be configured as a terminal such as a smartphone, a tablet PC, a personal digital assistant (PDA), a web pad, and the like, which is provided with a memory means and also a microprocessor to have arithmetic capabilities, and may provide various services to a user upon installation of various applications.

The user terminal 200 may include one or more sensors that can measure its own motion or posture. For example, the user terminal 200 may include at least one of a geomagnetic sensor, an acceleration sensor, a gyroscope sensor, and a motion sensor. A method of measuring the motion or posture of the user terminal 200 with the geomagnetic sensor, the acceleration sensor, the gyroscope sensor, the motion sensor, and the like is a known technique, and thus a detailed description thereof will be omitted.

The user terminal 200 may be installed with a service application (hereinafter referred to as "service application") that checks information on the IoT devices 100a, 100b, and 100c and support the user to control the IoT devices 100a, 100b, and 100c.

Details of the user controlling the IoT devices 100a, 100b, and 100c through the user terminal 200 on which the service application is installed will be described in detail below.

The service server 300 may be registered with the IoT devices 100a, 100b, and 100c. In addition, the service server 300 may provide IoT device information to the user terminal 200 that has access to the registered IoT devices 100a, 100b, and 100c so that the information can be displayed on screen through the service application. In addition, the service server 300 may transmit an IoT device control command input from the user to the IoT devices 100a, 100b, and 100c through an IoT device control screen displayed on the screen of the user terminal 200 through the service application to cause an operation to be performed according to the control command.

Figure 2:
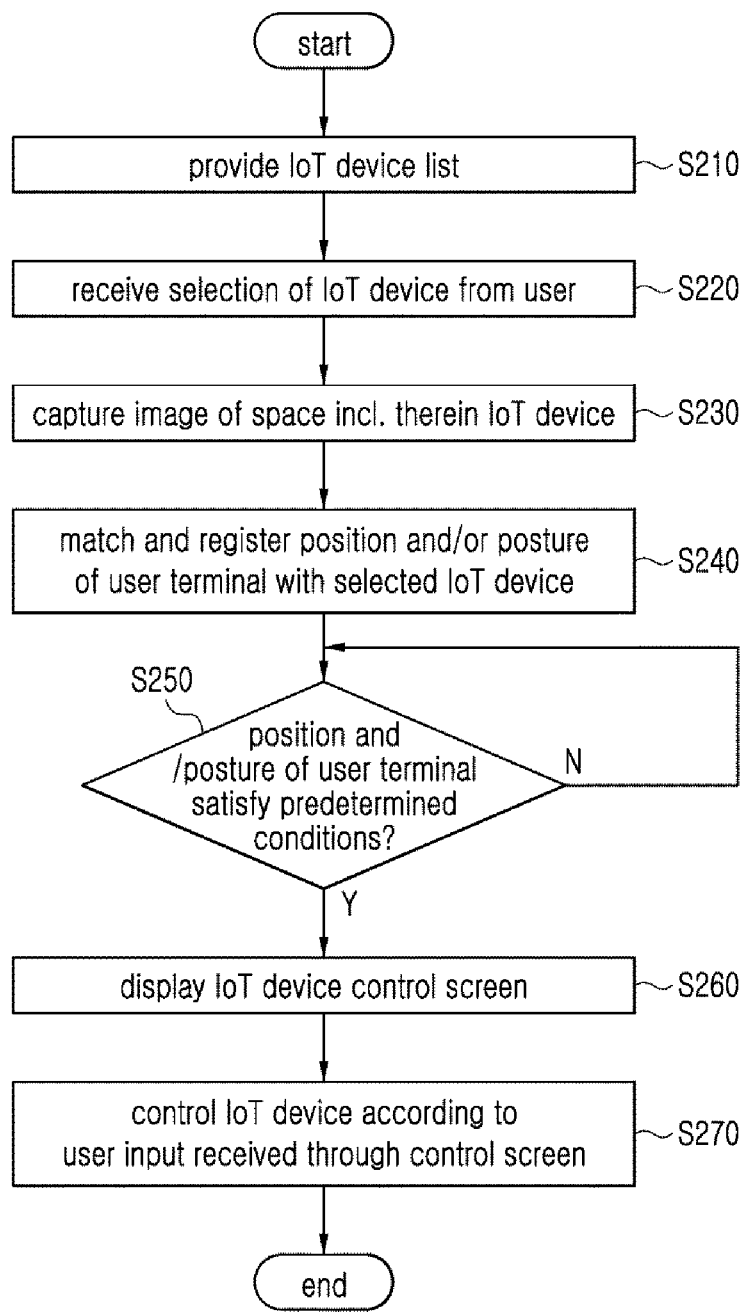
FIG. 2 is a flowchart provided to explain an operation of the IoT device control system according to an embodiment of the present disclosure.

FIG. 2 is a flowchart provided to explain an operation of the IoT device control system according to an embodiment of the present disclosure.

Referring to FIGS. 1 and 2, upon request of the user, the user terminal 200 may receive a list of registered IoT devices from the service server 300 and provide the list to the user through a service application (S210).

Figure 3:
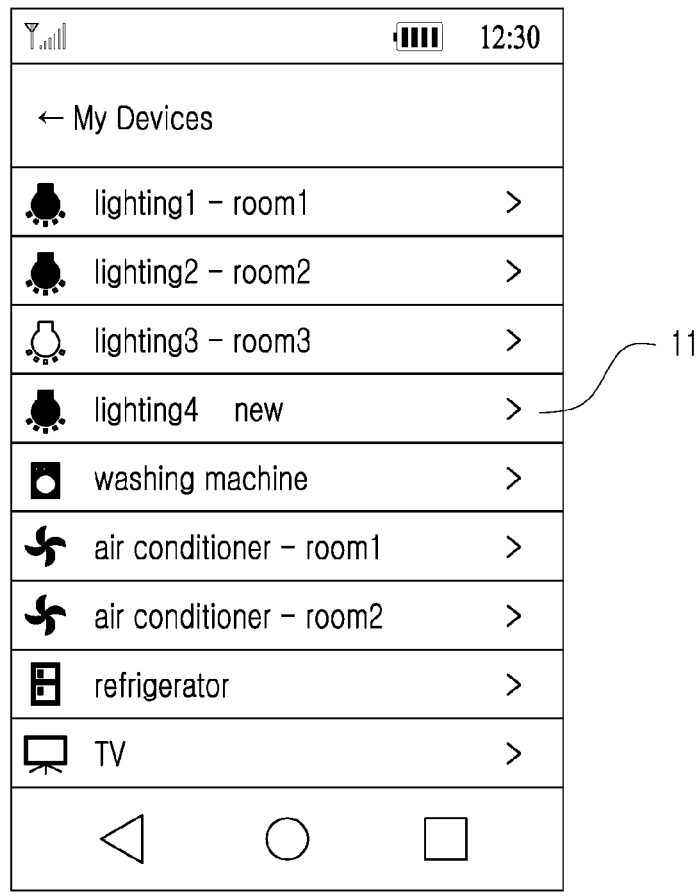
FIG. 3 is a diagram illustrating a list of IoT devices displayed on a user terminal according to an embodiment of the present disclosure.

FIG. 3 is a diagram illustrating a list of IoT devices displayed on a user terminal according to an embodiment of the present disclosure.

At S210, the service application may display the IoT device list 11 as shown in FIG. 3 on the screen of the user terminal 200. FIG. 3 shows that an IoT device corresponding to 'lighting 4' is newly registered. It goes without saying that, for a method of displaying a list of registered IoT devices, other methods than those shown in FIG. 3 may be applied.

Next, the user terminal 200 may receive a selection of the IoT device corresponding to 'lighting 4' from the IoT device list (S220). Then, the user terminal 200 may activate a camera function.

Thereafter, the user may carry the user terminal 200 to the vicinity of the IoT device corresponding to 'lighting 4' and capture an image of the space that includes therein the IoT device therein (S230).

Figure 4:
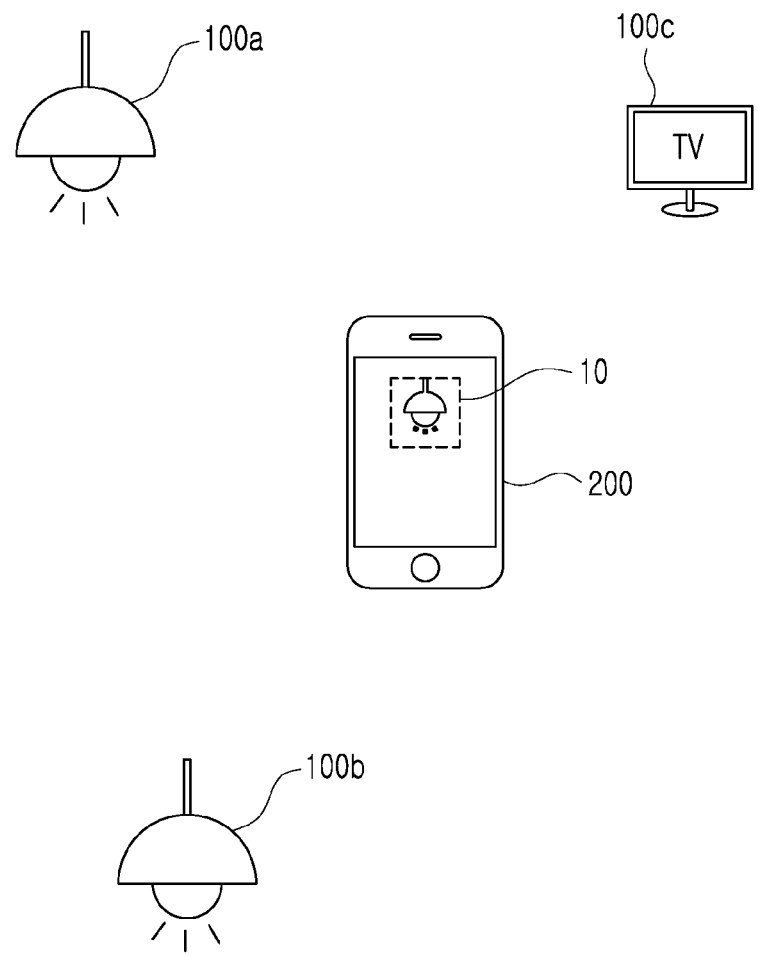
FIG. 4 is a diagram showing an example of a user terminal capturing an image of an IoT device in according to an embodiment of the present disclosure.

FIG. 4 is a diagram showing an example of a user terminal capturing an image of an IoT device in according to an embodiment of the present disclosure.

When it is assumed that the IoT device 100a is an IoT device corresponding to 'lighting 4', in the real space where the IoT devices 100a, 100b, and 100c are positioned, the user may carry the user terminal 200 to the vicinity of the IoT device 100a. In addition, using the user terminal 200, the user may capture the image of the space that includes therein the IoT device 100a. At S230, an imaging guide 10 may be displayed on a camera imaging screen of the user terminal 200 according to an embodiment such that capturing an image may be performed with the IoT device 100a being within the imaging guide 10. Of course, it may also be possible to capture the image of the IoT device 100a without having the imaging guide 10 displayed.

At S230, when capturing an image of the space that includes therein the IoT device 100a, the user terminal 200 may check its own position by interworking with the indoor positioning system 120. Further, according to an embodiment, when the user terminal 200 captures an image of the space that includes therein the IoT device 100a, it may also check its own posture information using an inertial sensor provided in the user terminal 200.

Meanwhile, according to an embodiment, it may be possible to perform the operation at S230 of capturing the image of the space that includes therein the IoT device 100a first, and then perform the operation at S210 of displaying the IoT device list and the operation at S220 of selecting the IoT device.

Next, when capturing the image of the space that includes therein the IoT device 100a, the user terminal 200 may transmit the position and posture information of the user terminal 200 to the service server 300 so that the information is matched and registered with the IoT device 100a (S240). At S240, the user terminal 200 may transmit identification information (e.g., device ID) of the IoT device 100a to the service server 300 together with the position and posture information of the user terminal 200. Depending on embodiments, only the position information of the user terminal 200 may be matched and registered with the IoT device 100a.

Figure 5:
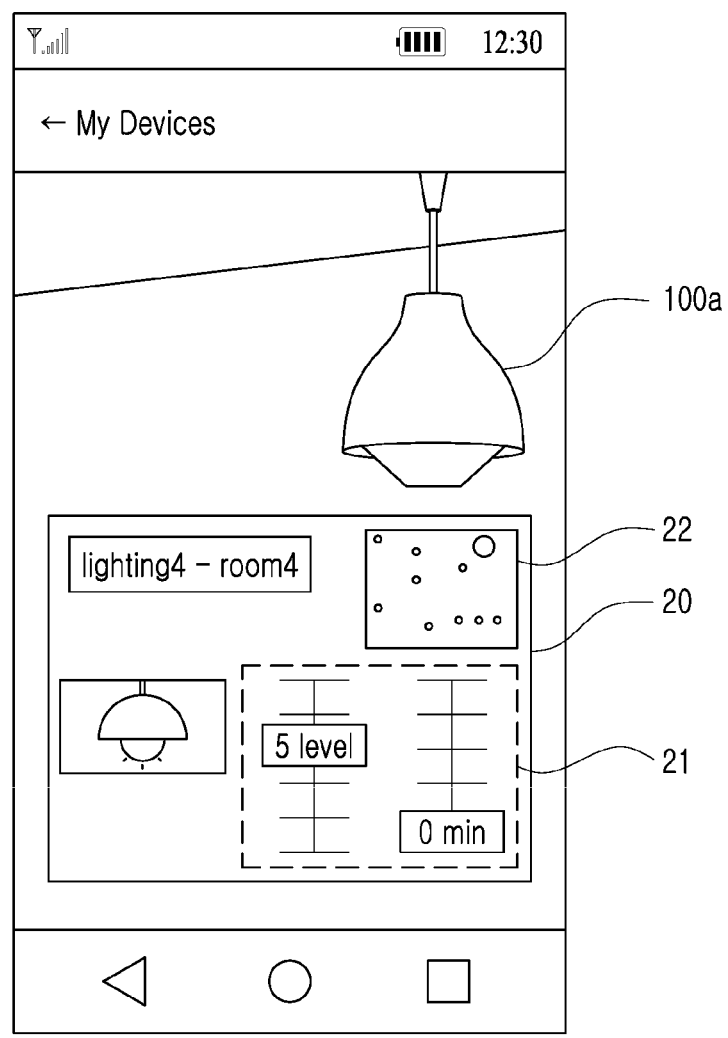
FIG. 5 is a diagram illustrating an IoT device control screen according to an embodiment of the present disclosure.

Thereafter, when the position and/or posture of the user terminal 200 satisfy conditions that are determined based on the matched and registered position and/or posture for the IoT device 100a (S250-Y), the user terminal 200 may display a control screen for the corresponding IoT device 100a as illustrated in FIG. 5 (S260).

At S250, the conditions for outputting the IoT device control screen may be determined such that the conditions are satisfied when the user terminal 200 is positioned within a position range determined based on the position of the user terminal matched and registered with the IoT device 100a. Alternatively, the conditions may be determined such that the conditions are satisfied when the position condition of the user terminal 200 described above is satisfied, and in addition, when the posture of the user terminal 200 is within a posture range determined based on the posture of the user terminal matched and registered with the IoT device 100a.

FIG. 5 is a diagram illustrating an IoT device control screen according to an embodiment of the present disclosure.

At S260, the user terminal 200 may output a control screen 20 for the IoT device 100a over the image obtained by capturing the image of the space that includes therein the IoT device 100a. The control screen 20 may include information 22 indicating the position of the IoT device 100a in space. The position of the IoT device 100a displayed in the information 22 may be the position of the user terminal 200 obtained at S230. In addition, the control screen 20 may include a user interface 21 capable of controlling the IoT device 100a. FIG. 5 shows an example in which the brightness level and duration of the lighting may be adjusted for the IoT device 100a that is a lighting.

Then, the IoT device 100a may be controlled according to a user input received through the control screen 20 (S270). The user terminal 200 may transmit a control command corresponding to the user input on the control screen 20 to the service server 300. Then, the service server 300 may transmit this back to the IoT device 100a to cause an operation to be performed according to the control command.

Meanwhile, with the position and/or posture information of the user terminal having been matched and registered with the IoT device 100a through operations at S210 to S230 according to an embodiment, it may be possible to control the IoT device 100a based on virtual reality from a remote position away from the real space.

The service server 300 creates a virtual space corresponding to the real space where the IoT device 100a is positioned, and provide it through a virtual reality support terminal (not shown) such as the user terminal 200 or a head mounted display (HMD) terminal.

The IoT device 100a may be disposed at a position in the virtual space corresponding to the position in the real space. The position of the IoT device 100a in the virtual space may be determined using the position information of the user terminal that is matched and registered with the IoT device 100a as described above.

When the user accesses the virtual space from a remote position away from the real space by using the user terminal 200 or the virtual reality support terminal, the service server 300 may provide a virtual space screen to the user based on a predetermined position and viewpoint on the virtual space.

In addition, when the user changes the position and the viewpoint of the user in the virtual space by using the user terminal 200 or the virtual reality support terminal, the service server 300 may provide a corresponding virtual space screen. In addition, when the position and the viewpoint of the user in the virtual space satisfy a predetermined condition, the service server 300 may display a control screen for the IoT device 100*a* in the virtual space.

Next, the service server 300 may transmit a control command for controlling the IoT device 100*a* in accordance with a user input received through the control screen displayed in the virtual space.

The example where the IoT device is registered in advance has been described above. Depending on embodiments, however, it is also possible to match and register the position and/or the posture of the user terminal in the process of registering the IoT device, and control the IoT device accordingly.

Figure 6:
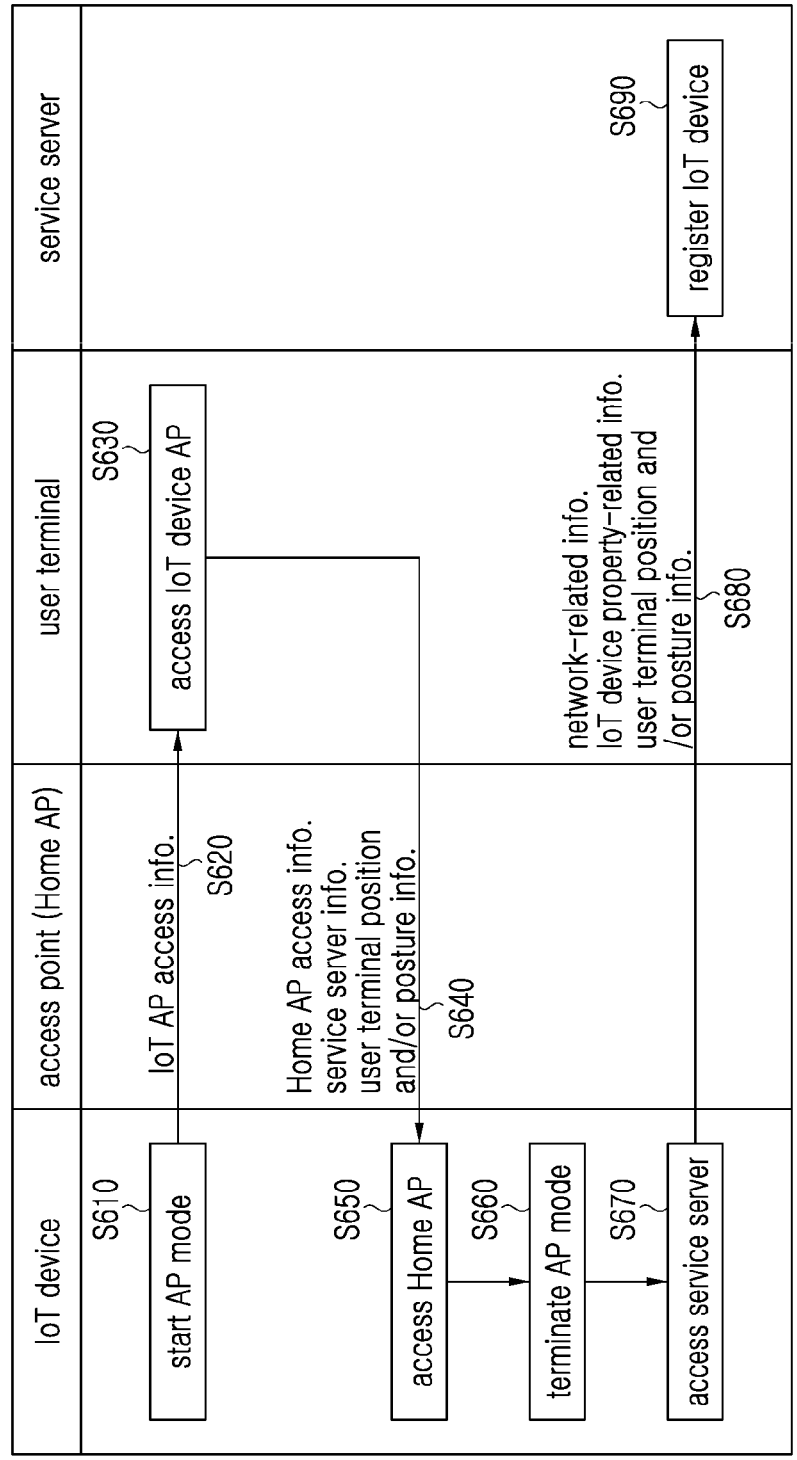
FIG. 6 is a diagram provided to explain an IoT device registration process according to an embodiment of the present disclosure.

FIG. 6 is a diagram provided to explain an IoT device registration process according to an embodiment of the present disclosure.

Referring to FIG. 6, the IoT device 100*a* may be operated in a mode (AP mode) as a Wi-Fi access point (S610). Then, the IoT device 100*a* may broadcast IoT AP access information including its own SSID or the like (S620).

Thereafter, using the IoT AP access information, the user terminal 200 may access the IoT device 100*a* as an access point (S630).

In addition, the user terminal 200 may transmit Home AP information, service server information, and a position and/or posture information of the user terminal to the IoT device 100*a* (S640). At S640, the position and/or the posture information of the user terminal may be obtained when the user terminal 200 captures an image of the space that includes therein the IoT device 100*a*.

The home AP information may include SSID, password, and the like of the access point 110. The service server information may include information necessary for the IoT device 100*a* to access the service server 300 and register itself.

The IoT device 100*a* may access the access point 110 (S650) by using the information transmitted at S540, and terminate the AP mode (S660).

Next, the IoT device 100*a* may access the service server 300 through the access point 110 (S670).

Thereafter, the IoT device 100*a* may transmit network-related information, IoT device property-related information, and user terminal position and/or posture information to the service server 300 (S680), to perform IoT device registration (S690). At S690, the terminal position and/or posture information of the user may be matched and registered with the IoT device 100*a*.

Then, as described above, when the position and/or the posture of the user terminal 200 satisfy the predetermined conditions, the control screen for the IoT device 100*a* may be automatically output on the screen of the user terminal 200. It goes without saying that, when accessing a virtual space, a control screen for the IoT device 100*a* may also be displayed on the virtual space displayed through the user terminal 200 or the virtual reality support terminal.

Embodiments of the present disclosure include a computer-readable medium including program instructions for performing various computer-implemented operations. The medium records a program for executing the methods described above. The medium may include program instructions, data files, data structures, and so on, either alone or in combination. Examples of such medium include a magnetic medium such as hard disk, floppy disk and magnetic tape, an optical recording medium such as CD and DVD, a magneto-optical medium, and a hardware device configured to store and carry out program instructions, such as ROM, RAM, flash memory, and so on. Examples of program instructions include high-level language codes that may be executed by a computer using an interpreter, and so on as well as machine language codes such as those generated by a compiler.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An Internet of Things (IoT) device control method using virtual reality and augmented reality, comprising:
   by a user terminal, capturing an image of a real space that includes therein one or more IoT devices;
   when capturing the image, matching and registering a posture of the user terminal with an IoT device selected by a user;
   displaying a control screen for the selected IoT device when the user terminal satisfies a condition, wherein the condition is determined by using the posture of the user terminal matched and registered with the selected IoT device; and
   controlling the selected IoT device according to a user input received through the control screen.

2. The IoT device control method according to claim 1, further comprising, when a position and a viewpoint of a user in a virtual space in which the one or more IoT terminals are disposed correspondingly to the real space satisfy the condition, displaying a control screen for the selected IoT device in the virtual space; and
   controlling the selected IoT device according to a user input received through the control screen displayed in the virtual space.

3. An Internet of Things (IoT) device control system using virtual reality and augmented reality, comprising:
   a user terminal configured to capture an image of a real space that includes therein one or more IoT devices; and
   a server configured to, when capturing the image, match and register a posture of the user terminal with an IoT device selected by a user,
   wherein the user terminal is configured to display a control screen for the selected IoT device when the user terminal satisfies a condition, wherein the condition is determined by using the posture of the user terminal matched and registered with the selected IoT device, and
   the server is configured to transmit a control command for controlling the selected IoT device to the selected IoT device according to a user input received through the control screen.

4. The IoT device control system according to claim 3, wherein the server is configured to:
   when a position and a viewpoint of a user in a virtual space in which the one or more IoT terminals are disposed correspondingly to the real space satisfy the condition, display a control screen for the selected IoT device in the virtual space; and
   transmit a control command for controlling the selected IoT device to the selected IoT device according to a user input received through the control screen displayed in the virtual space.

* * * * *